(12) United States Patent
Ichino et al.

(10) Patent No.: US 9,708,695 B2
(45) Date of Patent: Jul. 18, 2017

(54) ROLL OUTER LAYER MATERIAL, AND COMPOSITE ROLL FOR HOT ROLLING

(71) Applicant: JFE Steel Corporation, Tokyo (JP)

(72) Inventors: Kenji Ichino, Tokyo (JP); Tetsuo Mochida, Tokyo (JP); Hiromitsu Shibata, Tokyo (JP)

(73) Assignee: JFE Steel Corporation (JP)

( * ) Notice: Subject to any disclaimer, the term of this patent is extended or adjusted under 35 U.S.C. 154(b) by 41 days.

(21) Appl. No.: 14/769,841

(22) PCT Filed: Feb. 25, 2014

(86) PCT No.: PCT/JP2014/000985
§ 371 (c)(1),
(2) Date: Aug. 24, 2015

(87) PCT Pub. No.: WO2014/132628
PCT Pub. Date: Sep. 4, 2014

(65) Prior Publication Data
US 2015/0376748 A1 Dec. 31, 2015

(30) Foreign Application Priority Data
Mar. 1, 2013 (JP) ................................. 2013-040298

(51) Int. Cl.
*C22C 37/06* (2006.01)
*B21B 27/00* (2006.01)
(Continued)

(52) U.S. Cl.
CPC .............. *C22C 37/06* (2013.01); *B21B 27/00* (2013.01); *B21B 27/03* (2013.01); *C22C 37/00* (2013.01); *C22C 37/10* (2013.01)

(58) Field of Classification Search
CPC ......... C22C 37/06; C22C 37/10; C22C 37/00; B21B 27/03; B21B 27/00; B21B 39/008; B21B 39/165
See application file for complete search history.

(56) References Cited

U.S. PATENT DOCUMENTS 5,813,962 A * 9/1998 Kanayama .............. B21B 27/00
492/54
8,156,651 B2 * 4/2012 Furushima .............. B21B 27/00
148/324
(Continued)

FOREIGN PATENT DOCUMENTS

CN         8-73977      3/1996
CN      101386961     3/2009
(Continued)

OTHER PUBLICATIONS

Supplementary European Search Report dated Mar. 14, 2016, of corresponding European Application No. 14756297.9.
(Continued)

*Primary Examiner* — Jason L Vaughan
(74) *Attorney, Agent, or Firm* — DLA Piper LLP (US)

(57) ABSTRACT

A roll outer layer material contains small-size carbides having a circle equivalent diameter of 3 to 30 μm in a number of 500 to 2500 pieces/mm$^2$ and large-size carbides having a circle equivalent diameter of 50 μm or more in a number of 20 pieces/mm$^2$ or less, preferably having a chemical composition containing, by mass %, C: 2.4% or more and 2.9% or less, Si: 0.2% or more and 1.0% or less, Mn: 0.2% or more and 1.0% or less, Cr: 4.0% or more and 7.5% or less, Mo: 4.0% or more and 6.5% or less, V: 5.3% or more and 7.0% or less, Nb: 0.5% or more and 3.0% or less, and the balance being Fe and inevitable impurities, in which the contents of Cr, Mo, and V satisfy the relationship $1.5 \leq (Cr+Mo)/V \leq 2.4$.

4 Claims, 2 Drawing Sheets

(51) Int. Cl.
*C22C 37/00* (2006.01)
*B21B 27/03* (2006.01)
*C22C 37/10* (2006.01)

(56) References Cited

U.S. PATENT DOCUMENTS 8,308,622 B2 * 11/2012 Furushima .............. B21B 27/03
428/656
9,221,232 B2 * 12/2015 Oda ........................ B22D 13/02

FOREIGN PATENT DOCUMENTS

| CN | 102330014 | 1/2012 |
|---|---|---|
| EP | 0 698 670 | 2/1996 |
| EP | 1 975 265 | 10/2008 |
| JP | 03-000404 A | 1/1991 |
| JP | 04-365836 A | 12/1992 |
| JP | 05-001350 A | 1/1993 |
| JP | 05-148510 A | 6/1993 |
| JP | 05-271875 A | 10/1993 |
| JP | 05-339673 A | 12/1993 |
| JP | 09-099306 A | 4/1997 |
| JP | 2005-105296 A | 4/2005 |
| JP | 2006-283168 | 10/2006 |
| JP | 2007-196257 A | 8/2007 |
| JP | 2009-221573 A | 10/2009 |
| JP | 2010-101752 A | 5/2010 |

OTHER PUBLICATIONS

English translation of the Search Report dated Apr. 21, 2016, from a corresponding Chinese Application No. 201480012268.5.
Concise Statement of Relevance of Office Action in English from a corresponding Taiwanese Office Action dated Jun. 27, 2016.
Korean Office Action dated Mar. 13, 2017, of corresponding Korean Application No. 2015-7022876, along with a Concise Statement of Relevance of Office Action in English.

* cited by examiner

ROLL OUTER LAYER MATERIAL, AND COMPOSITE ROLL FOR HOT ROLLING

TECHNICAL FIELD

This disclosure relates to a roll outer layer material for forming an outer layer of a composite roll for hot rolling in a hot rolling finishing mill for steel sheets and a composite roll for hot rolling having an outer layer composed of the roll outer layer material.

BACKGROUND

Recently, the usage environment of a roll has become much harsher as hot rolling techniques for manufacturing steel sheets progress. Also, recently, the production amount of steel sheets such as high strength steel sheets and thin steel sheets which require a high rolling load is increasing. Therefore, there is a growing tendency for surface deterioration and chipping scars to occur due to fatigue of a rolling surface of a roll for hot rolling. "Roll for hot rolling" refers to a work roll to be used for finish rolling.

Nowadays, a high speed steel roll whose abrasion resistance is increased by adding V to steel in an amount of several percent to form hard carbides in a large amount is often used in hot rolling.

For example, Japanese Unexamined Patent Application Publication Nos. 4-365836 and 5-1350 propose roll outer layer materials of high speed steel for hot rolling. The roll outer layer material for hot rolling described in JP '836 contains C: 1.5% to 3.5%, Ni: 5.5% or less, Cr: 5.5% to 12.0%, Mo: 2.0% to 8.0%, V: 3.0% to 10.0%, and Nb: 0.5% to 7.0%. In addition, the roll outer layer material for hot rolling described in JP '836 contains Nb and V so that the contents of Nb, V, and C satisfy a specified relationship and so that the ratio between the contents of Nb and V is within a specified range. It is said that, by using this material, since the segregation of hard carbides in the outer layer material is inhibited even if a centrifugal casting method is used, it is possible to obtain a roll outer layer material for hot rolling excellent in terms of abrasion resistance and crack resistance.

The roll outer layer material for hot rolling described in JP '350 contains C: 1.5% to 3.5%, Cr: 5.5% to 12.0%, Mo: 2.0% to 8.0%, V: 3.0% to 10.0%, and Nb: 0.5% to 7.0%. In addition, the roll outer layer material for hot rolling described in JP '350 contains C, Nb, and V so that the contents of Nb, V, and C satisfy a specified relationship and so that the ratio between the contents of Nb and V is within a specified range. By using this material, since the segregation of hard carbides in the outer layer material is suppressed even if a centrifugal casting method is used, there is an increase in abrasion resistance and crack resistance of the roll for hot rolling. Therefore, it is said the technique described in JP '350 contributes to an increase in efficiency of hot rolling.

However, the usage environment of a roll for hot rolling has become harsher with improved quality and increased productivity of products manufactured by performing hot rolling. Moreover, since the requirement for the surface quality of products manufactured by performing hot rolling has become more severe and, since the number of steel sheets manufactured using continuous rolling processes is increasing, inhibiting the fatigue damage of a roll surface such as surface deterioration is a larger problem to be solved than suppressing abrasion of a roll.

To solve such a problem, Japanese Unexamined Patent Application Publication No. 2009-221573 proposes a composite roll produced through centrifugal casting method, which contains C: 2.2% to 2.6%, Cr: 5.0% to 8.0%, Mo: 4.4% to 6.0%, V: 5.3% to 7.0%, and Nb: 0.6% to 1.3%, and in which the contents of C, Mo, V, and Nb are controlled so that the contents of Mo+V and C−0.24V−0.13Nb are within specified ranges. It is said that this composite roll produced through centrifugal casting method has a roll surface layer excellent in terms of fatigue resistance in a hot rolling environment.

However, recently, rolling technology has been progressing at a high speed to manufacture rolled steel sheets of higher quality and higher grade. Also, it is strongly required to save rolling costs. As described above, the usage environment of a roll for hot rolling has become harsher. In particular, the occurrence of fatigue damages on the surface of a roll for hot rolling such as surface deterioration and chipping which are caused mainly by the fracturing of a large-size carbide on the surface of a roll for hot rolling is seen as a problem. It is confirmed that the fatigue damages described above still occur even when using the technique described in JP '573.

It could therefore be helpful to provide a roll outer layer material for hot rolling having a surface layer excellent in terms of fatigue resistance ("fatigue resistance" refers to the quality of inhibiting fatigue damages such as surface deterioration and chipping which occur on the surface layer of a roll when hot rolling is performed), and to provide a composite roll for hot rolling produced through centrifugal casting (hereinafter, also called composite roll for hot rolling) having an outer layer composed of the roll outer layer material.

SUMMARY

We thus provide:

[1] A roll outer layer material, which is a cast-iron roll outer layer material to be used for the outer layer of a composite roll for hot rolling, the material containing small-size carbides having a circle equivalent diameter of 3 to 30 μm in a number of 500 to 2500 pieces/mm$^2$ and large-size carbides having a circle equivalent diameter of 50 μm or more in a number of 20 pieces/mm$^2$ or less.

[2] The roll outer layer material according to item [1], the material having a chemical composition containing, by mass %, C: 2.4% or more and 2.9% or less, Si: 0.2% or more and 1.0% or less, Mn: 0.2% or more and 1.0% or less, Cr: 4.0% or more and 7.5% or less, Mo: 4.0% or more and 6.5% or less, V: 5.3% or more and 7.0% or less, Nb: 0.5% or more and 3.0% or less, and the balance being Fe and inevitable impurities, in which the contents of Cr, Mo and V satisfy expression (1) below:

$$1.5 \leq (Cr+Mo)/V \leq 2.4 \tag{1},$$

where Cr, Mo and V respectively represent the contents (mass %) of the corresponding chemical elements.

[3] The roll outer layer material according to item [2], the material having the chemical composition further containing, by mass %, one or more of Al: 0.001% or more and 0.05% or less, and REM: 0.001% or more and 0.03% or less.

[4] A composite roll for hot rolling, which is a composite roll for hot rolling formed an outer layer and an inner layer that are integrally welded together, the outer layer being formed of the roll outer layer material according to any one of items [1] to [3].

Even when the composite roll for hot rolling is used in a harsh hot rolling environment in which high rolling load is applied or in which continuous rolling is often performed, hot rolling fatigue damage (fatigue damage due to hot rolling) of a roll surface such as surface deterioration and surface chipping are less likely to occur. Therefore, it is possible to achieve a significant increase in surface quality and an increase in roll life at the same time.

It is also possible to easily produce a composite roll for hot rolling having significantly increased fatigue resistance. Therefore, it is possible to achieve all of an increase in the productivity, a significant increase in surface quality, and an increase in roll life of a hot-rolled steel sheet.

DETAILED DESCRIPTION

Figure 1:
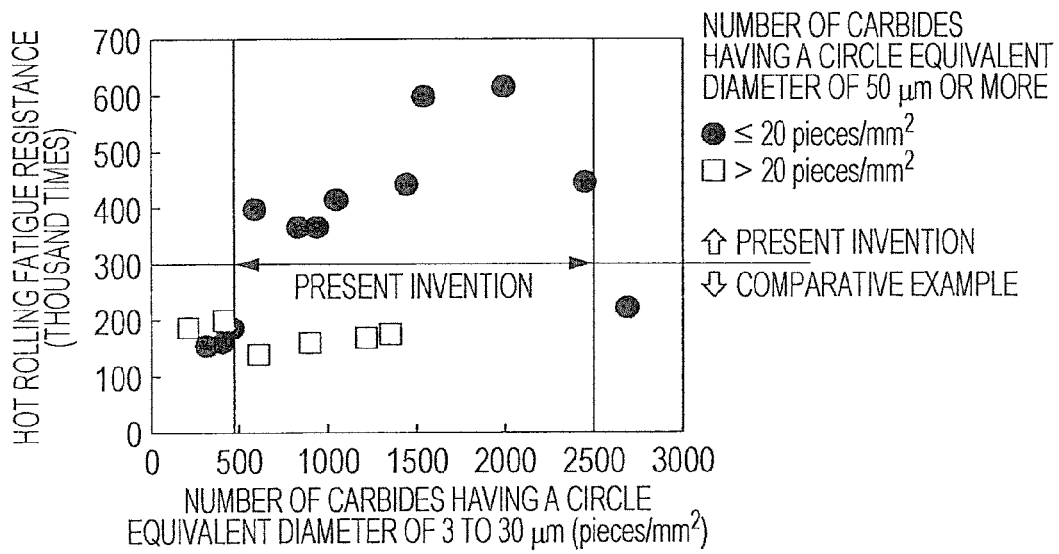
FIG. 1 is a diagram illustrating the relationship of hot rolling contact fatigue life in a hot rolling contact fatigue test to the area ratio of granular carbides and the number of large-size carbides per unit area.

We conducted investigations on the roll surfaces on which surface deterioration or chipping due to hot rolling (rolling at a high temperature), and obtained important knowledge that the surface layer of a roll fractures, because of a crack whose initiation and propagation occur in a large-size carbide having a circle equivalent diameter of more than 50 μm, results in surface deterioration or chipping. Therefore, we conducted investigations on how to control carbide morphology to increase fatigue resistance through, for example, close investigations on the damage morphology induced by carbides on the surface of the outer layer of a composite roll for hot rolling and, as a result, found a new phenomenon in which, when there is a decrease in the number of large-size carbides having a circle equivalent diameter of 50 μm or more and when there is an increase in the number of small-size carbides (having various sizes of 3 to 30 μm in terms of the circle equivalent diameter), occurrence of damage on the surface of the outer layer of a composite roll for hot rolling is significantly suppressed.

To technologically realize a significant increase in fatigue resistance, we conducted further investigations and clarified the quantitative optimum ranges for large-size carbides and small-size carbides.

Also, by conducting investigations on a chemical composition, we found preferable ranges for the contents of the constituent chemical elements and obtain non-conventional knowledge that, by controlling the contents of the constituent chemical elements so that V content and (Cr content+Mo content) satisfy a specified relationship, there is a significant increase in the fatigue resistance of a roll when hot rolling is performed.

First, our experimental results will be described.

To prepare raw materials for hot rolling contact fatigue test samples having various numbers of large-size carbides having a circle equivalent diameter of 50 μm or more and various numbers of small-size carbides having a circle equivalent diameter of 3 to 30 μm, molten steels having chemical compositions containing, by mass %, C: 1.9% to 2.9%, Si: 0.3% to 0.9%, Mn: 0.4% to 1.0%, and the balance being Fe and inevitable impurities, and further containing Cr, Mo, V, Nb, Al, and REM in various amounts within the ranges of Cr: 3.7% to 13.6%, Mo: 4.1% to 7.0%, V: 4.5% to 8.1%, Nb: 0% to 3.6%, Al: 0% to 0.046%, and REM: 0% to 0.027% were produced using a high-frequency furnace and cast into ring roll materials (having an outer diameter of 250 mmφ, a width of 75 mm, and a thickness of 55 mm) which correspond to roll outer layer materials using a centrifugal casting method. The casting temperature was 1450° C. to 1530° C. and the centrifugal force was 180 G in multiples of gravity. In addition, after casting was performed, by performing a quenching and tempering treatment multiple times with a quenching temperature of 1050° C. and with a tempering temperature of 530° C. to 560° C., the shore hardness of the ring roll materials described above was controlled to HS80 to HS87.

Figure 3:
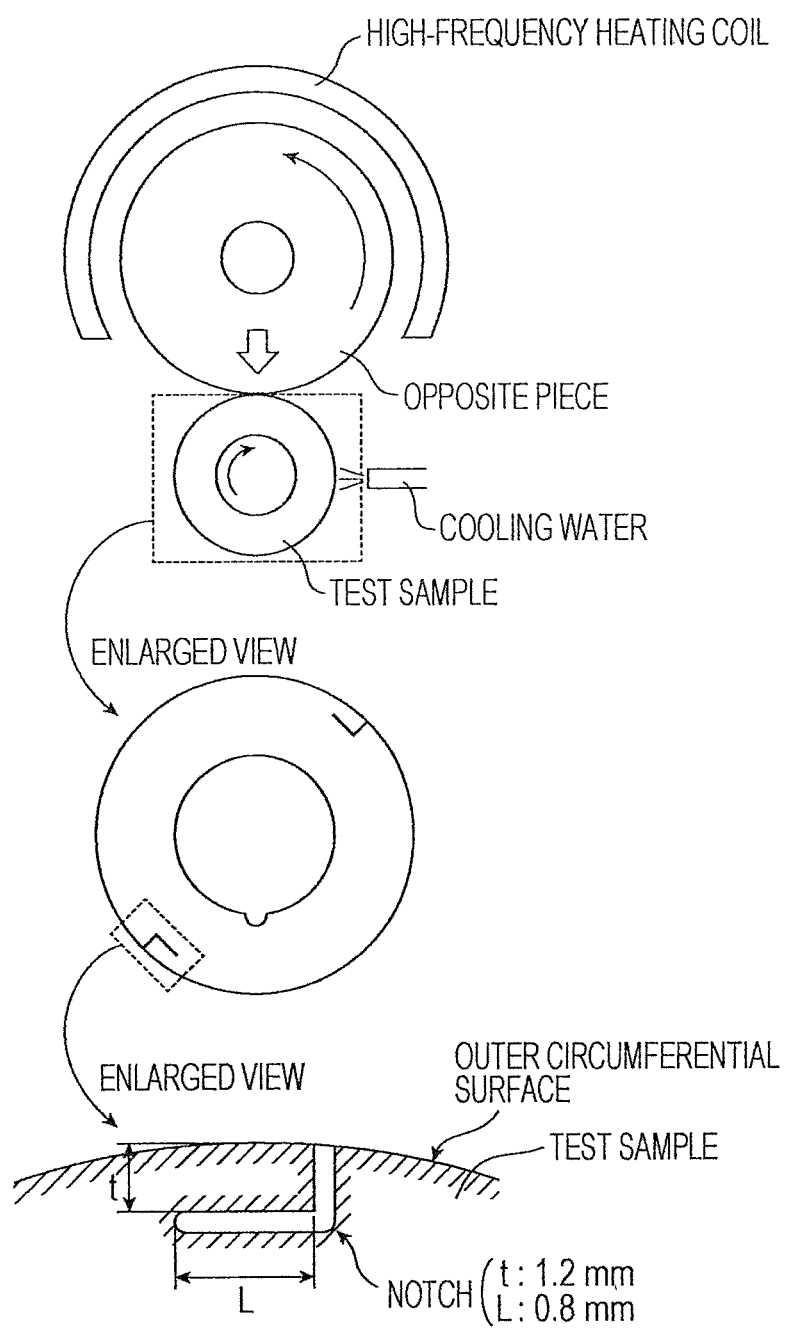
FIG. 3 is a schematic diagram illustrating the structure of a testing machine used for a hot rolling contact fatigue test, a hot rolling contact fatigue test sample (fatigue test sample), and the shape and size of a notch which was formed in the outer circumferential surface of the hot rolling contact fatigue test sample (fatigue test sample).

A hot rolling contact fatigue test sample (having an outer diameter of 60 mmφ and a thickness of 10 mm) which had been taken from the obtained ring roll material was used to perform a hot rolling contact fatigue test (a test described in Japanese Unexamined Patent Application Publication No. 2010-101752) by which evaluation of the fatigue resistance of a work roll for hot rolling in a practical production line can be performed with high repeatability. As illustrated in FIG. 3, notches (having a depth t of 1.2 mm and a length L in the circumferential direction of 0.8 mm) were formed at two positions in the outer circumferential surface of the hot rolling contact fatigue test sample by using an electric spark forming method (wire cutting method) with a wire having a diameter of 0.2 mmφ. In addition, the edges of the rolling contact surface of the hot rolling contact fatigue test sample had chamfered corners of 1.2 C.

Figure 2:
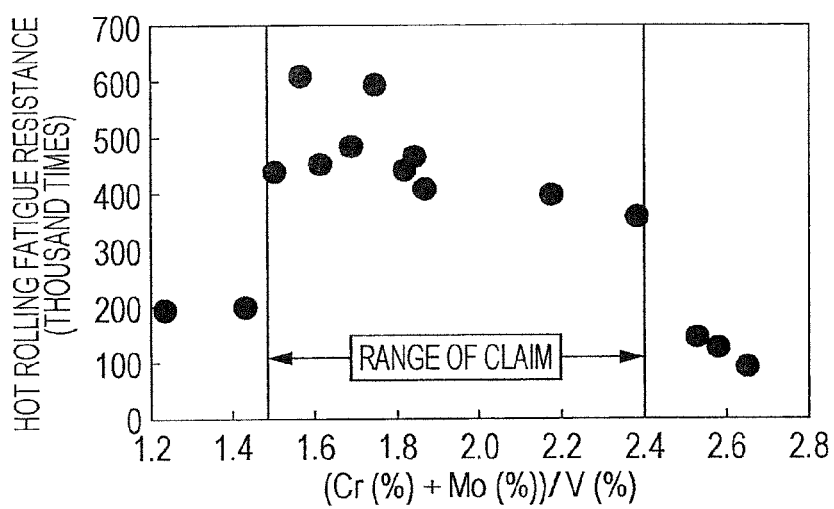
FIG. 2 is a diagram illustrating the relationship between hot rolling contact fatigue life in a hot rolling contact fatigue test and the value of (Cr (%)+Mo (%))/V (%).

The hot rolling fatigue test was, as illustrated in FIG. 3, performed between two discs which were the notched test sample (hot rolling contact fatigue test sample) and a heated opposite material by using a slip rolling fatigue type method. That is, as illustrated in FIG. 3, while the test sample (hot rolling fatigue test sample) was cooled with water and rotated at a rotational speed of 700 rpm, the opposite piece (composed of S45C and having an outer diameter of 190 mmφ and a width of 15 mm) was heated at a temperature of 810° C., pressed onto the rotating test sample with a contact load of 980 N, and rotated with a slip ratio of 9%. By rotating the test sample until the two notches formed in the hot rolling contact fatigue test sample broke, the rotation numbers until the notches broke were respectively counted, and the average of the two rotation numbers was defined as hot rolling contact fatigue life. When hot rolling contact fatigue life was more than 300 thousands, it is considered to have significantly excellent hot rolling contact fatigue life. The obtained results are illustrated in FIGS. 1 and 2. FIG. 1 illustrates the relationship between the hot rolling contact fatigue life (since hot rolling fatigue refers to hot rolling contact fatigue, hot rolling fatigue resistance refers to hot rolling contact fatigue life) and the numbers of large-size carbides and small-size carbides per unit area, and FIG. 2 illustrate the relationship between the hot rolling contact fatigue life and (Cr (%)+Mo (%))/V (%).

As FIG. 1 indicates, it is clarified that the hot rolling contact fatigue life significantly increases with increasing number of small-size carbides having a circle equivalent diameter of 3 to 30 μm. However, when the number of large-size carbides having a circle equivalent diameter of 50 μm or more is more than 20 pieces/mm$^2$, there is a significant decrease in hot rolling contact fatigue life even when the number of small-size carbides having a circle equivalent diameter of 3 to 30 μm is large. From this result (FIG. 1), it is clarified that it is necessary to control the number of large-size carbides having a circle equivalent diameter of more than 50 μm to be 20 pieces/mm$^2$ or less and the number of small-size carbides having a circle equivalent diameter of 3 to 30 μm to be 500 to 2500 pieces/mm$^2$ to achieve a hot rolling contact fatigue life of 300 thousands or more (to significantly increase hot rolling contact fatigue life).

Moreover, from the viewpoint of the ratio of a chemical composition, as illustrated in FIG. 2, there is a significant decrease in hot rolling contact fatigue life in the case where (Cr (%)+Mo (%))/V (%) is less than 1.5 or more than 2.4. Cr and Mo are chemical elements which tend to form large-size carbides while V is a chemical element which tends to form small-size carbides and is effective in dividing the large-size carbides described above and decreasing the size of the carbides. Therefore, (Cr (%)+Mo (%))/V (%) is a newly found limitation expression as an index to improve carbide morphology to increase hot rolling contact fatigue life.

By using this hot rolling contact fatigue test, it is possible to easily evaluate the hot rolling contact fatigue life of the material of a roll for hot rolling. When the value indicating the hot rolling contact fatigue life of a roll outer layer material is large, the material can give excellent durability to the outer layer of a composite roll for hot rolling so that surface deterioration is less likely to occur and the number of chippings is small even if the material is used in a harsh rolling environment.

The amount of microstructure of the carbides in a roll was determined using the following method. First, mirror polishing was performed on the cut surface of a sample which was cut out of an arbitrary portion positioned at 20 to 25 mm in the depth direction from the surface of the roll in the early stage of use. Subsequently, the polished cut surface was over-etched a little using a nital solution so that the carbides appeared white against a dark base phase under an optical microscope. Then, the carbide morphology on the cut surface was observed using an image analysis device at a magnification of 100 times under the microscope (200 times on the monitor). The number of large-size carbides having a circle equivalent diameter of 50 μm or more and the number of small-size carbides having a circle equivalent diameter of 3 to 30 μm were determined. The observed field of view area was 9 mm$^2$.

Since the roll outer layer material is produced through a centrifugal casting method, it is possible to use the material as a ring roll or a sleeve roll in the cast state. In addition, the roll outer layer material is used as an outer layer material of a composite roll for hot rolling which can ideally be used for hot finishing rolling. In addition, the composite roll for hot rolling is composed of an outer layer manufactured using a centrifugal casting method and an inner layer integrally welded to the outer layer. An intermediate layer may be placed between the outer layer and the inner layer. That is, the roll may be composed of the outer layer, the intermediate layer which is integrally welded to the outer layer, and the inner layer integrally welded to the intermediate layer instead of being composed of the outer layer and the inner layer integrally welded to the outer layer. In this case, it may be said that the outer layer and the inner layer are integrally welded together with the intermediate layer being interposed between them. It is preferable that the inner layer be manufactured using a static casting method. Although there is no particular limitation on the chemical compositions of the inner layer and the intermediate layer, it is preferable that the inner layer be composed of nodular graphite cast iron and that the intermediate layer be composed of high-carbon steel material containing C: 1.5 to 3 mass %.

The reasons for the limitations on the preferable chemical composition range of the roll outer layer material outer layer will be described. Hereinafter, mass % is represented simply by %, unless otherwise noted.

C: 2.4% or More and 2.9% or Less

C is effective to increase the hardness of the base phase by forming a solid solution and the abrasion resistance of the roll outer layer material by combining with carbide-forming elements to form hard carbides. The way in which carbides influence usage properties in rolling varies in accordance with the C content. "Usage property in rolling" refers to a property required for a rolling roll outer layer material, the required property being a combination of the lubrication performance and fatigue resistance of the surface of a roll outer layer material when rolling is performed. When the C content is less than 2.4%, since there is an insufficient amount of carbides, frictional force on the surface of the roll outer layer material is increased when rolling is performed, which may result in an unstable rolling state. On the other hand, when the C content is more than 2.9%, since there is an excessive increase in the amount of carbides, combined large-size carbides are formed, which may result in a decrease in fatigue resistance. Therefore, it is preferable that the C content is 2.4% or more and 2.9% or less. In addition, it is preferable that the C content is 2.7% or more and 2.9% or less when Al or REM is not added.

Si: 0.2% or More and 1.0% or Less

Si is a chemical element which functions as a deoxidizing agent and increases the casting performance of molten steel. It is preferable that the Si content be 0.2% or more. In addition, when the Si content is more than 1.0%, since the effects become saturated, it is impossible to expect an increase in effect corresponding to an increase in the Si content, which results in an economic disadvantage due to an increase in cost resulting from an increase in the Si content. Therefore, it is preferable that the Si content is 0.2% or more and 1.0% or less.

Mn: 0.2% or More and 1.0% or Less

Mn is effective to render S harmless by fixing S in the form of MnS. In addition, Mn is a chemical element effective to increase hardenability by forming a solid solution in the base phase. It is preferable that the Mn content be 0.2% or more to realize such effects. In addition, when the Mn content is more than 1.0%, since the effects become saturated, it is impossible to expect an increase in effect corresponding to an increase in the Mn content, which results in an economic disadvantage due to an increase in cost caused by an increase in the Mn content. In addition, when the Mn content is more than 1.0%, there may be a decrease in the toughness of a roll material. Therefore, it is preferable that the Mn content is 0.2% or more and 1.0% or less.

Cr: 4.0% or More and 7.5% or Less

Cr is a chemical element effective to increase abrasion resistance by combining with C to form mainly eutectic carbides and effective to stabilize rolling by reducing the damage to a roll surface as a result of decreasing the frictional force between a steel sheet and the surface of a roll outer layer material when rolling is performed. Moreover, Cr is effective to increase the strength of a roll outer layer material by forming an appropriate amount of solid solution in granular carbides and in the base phase. To realize such effects, it is preferable that the Cr content be 4.0% or more. On the other hand, when the Cr content is more than 7.5%, since there is an excessive increase in the amount of large-size eutectic carbides, there may be a decrease in fatigue resistance. Therefore, it is preferable that the Cr content is 4.0% or more and 7.5% or less.

Mo: 4.0% or More and 6.5% or Less

Mo is a chemical element which increases abrasion resistance by combining with C to form hard carbides. In addition, Mo increases the strength of carbides by forming a solid solution in hard MC-type carbides and also increases the fracture resistance of eutectic carbides by forming a solid solution in the eutectic carbides. Through these effects, Mo increases the fatigue resistance of a roll outer layer material. It is preferable that the Mo content be 4.0% or more to realize such effects. In addition, when the Mo content is more than 6.5%, since hard and brittle carbides containing mainly Mo are formed, there may be a decrease in fatigue resistance. Therefore, it is preferable that the Mo content is 4.0% or more and 6.5% or less.

V: 5.3% or More and 7.0% or Less

V is a chemical element which is important to achieve satisfactory abrasion and fatigue resistance at the same time. V is a chemical element which increases abrasion resistance by forming very hard granular carbides (MC-type carbides) and which significantly increases the fatigue resistance of a roll outer layer material by effectively functioning to divide large-size eutectic carbides to allow the eutectic carbides to dispersedly crystallize. Such effects are significant when the V content is 5.3% or more. In addition, when the V content is more than 7.0%, since there may be an increase in the grain diameter of MC-type carbides, and since the centrifugal casting segregation of MC-type carbides may be promoted, various properties of a roll for hot rolling become unstable in this case. Therefore, it is preferable that the V content is 5.3% or more and 7.0% or less.

Nb: 0.5% or More and 3.0% or Less

Nb increases fatigue resistance by increasing the strength of MC-type carbides as a result of forming a solid solution in granular MC-type carbides and by increasing fracture resistance as a result of coexisting with Mo. In addition, since Nb is a chemical element which is effective to prevent eutectic carbides from fracturing by promoting division of large-size eutectic carbides, Nb is a chemical element effective to increase the fatigue resistance of a roll outer layer material. In addition, Nb is effective to prevent segregation of MC-type carbides when centrifugal casting is performed. Such effects become significant when the Nb content is 0.5% or more. In addition, when the Nb content is more than 3.0%, since the growth of MC-type carbides in molten steel is promoted, segregation of carbides may be promoted when centrifugal casting is performed. Therefore, it is preferable that the Nb content is 0.5% or more and 3.0% or less, or more preferably 0.5% or more and 2.0% or less.

One or More of Al: 0.001% or More and 0.05% or Less and REM: 0.001% or More and 0.03% or Less Since Al and REM are both effective to strongly promote nucleation of granular carbides, Al and REM are effective to increase the number of small-size carbides. Therefore, Al and REM give excellent fatigue resistance to a roll outer layer material. It is preferable that at least one of Al and REM be added in an amount of 0.001% or more in total to realize such an effect. When the Al content is more than 0.05% or when the REM content is more than 0.03%, the effect becomes saturated, and a gas defect tends to occur. Therefore, it is preferable that one or more of Al: 0.001% or more and 0.05% or less and REM: 0.001% or more and 0.03% or less be added.

REM is a misch metal, which is a mixture of two or more of rare earth elements, and the REM content may be defined as twice the Ce content analyzed when it is difficult to analyze all the rare earth elements.

It is preferable that Cr, Mo, and V are properly added to satisfy expression (1) below, while the contents of them are within the respective ranges described above:

$$1.5 \leq (Cr+Mo)/V \leq 2.4 \qquad (1)$$

(where Cr, Mo, and V: the contents (mass %) of the corresponding chemical elements).

When expression (1) is not satisfied, that is, when the ratio of the amount of (Cr+Mo) to the amount of V is less than 1.5, there may be a situation where the desired excellent hot rolling contact fatigue life cannot be achieved. On the other hand the ratio of the amount of (Cr+Mo) to the amount of V is more than 2.4, since there is an excessive increase in the number of large-size eutectic carbides, there may be a significant decrease in hot rolling contact fatigue life. Therefore, it is preferable that (Cr+Mo)/V is 1.5 or more and 2.4 or less.

The balance of the chemical composition described above includes Fe and inevitable impurities. Examples of the inevitable impurities include P: 0.05% or less, S: 0.05% or less, N: 0.06% or less, B: 0.03% or less, and Ni: 0.2% or less.

Since P deteriorates material properties as a result of segregating at grain boundaries, it is preferable that the P content be as small as possible. However, it is acceptable that the P content be 0.05% or less.

In addition, since S deteriorates material properties as a result of existing in the form of sulfide-based inclusions, it is preferable that the S content be as small as possible. However, it is acceptable that the S content be 0.05% or less.

N is mixed into steel in an amount of about 0.01% to 0.06% in an ordinary steel making process. The effect is not affected by such the N content. However, since N may cause a gas defect which occurs at boundaries between the outer layer and intermediate layer of a composite roll or between the intermediate layer and the inner layer of a composite roll, it is preferable that the N content be less than 0.05%.

In addition, B is a chemical element which is mixed into steel from, for example, scrap, which is raw material for melting steel, and a casting flux, and B has a negative effect of decreasing carbides by forming a solid solution in the carbides. It is preferable that the B content be as small as possible. However, it is acceptable that the B content be 0.03% or less, because there is no marked negative effect on the effects.

Ni is a chemical element mixed into steel from scrap, which is raw material for melting steel and, since Ni has a negative effect on hardenability of a roll outer layer material, Ni causes variations in hardness and residual stress after a heat treatment has been performed. It is preferable that the Ni content be as small as possible. However, it is acceptable for manufacturing a roll that the Ni content be 0.2% or less.

Hereinafter, a preferable method of producing the composite roll for hot rolling will be described.

The roll outer layer material is produced through a centrifugal casting method which is inexpensive because of its low energy cost.

First, molten steel having the chemical composition for a roll outer layer material described above is poured into a rotating casting mold whose inner surface is covered with a refractory layer composed mainly of zircon and the like having a thickness of 1 to 5 mm so that the roll outer layer having a specified thickness is formed using a centrifugal casting method. It is preferable that the rotational speed of the casting mold be adjusted so that a centrifugal force of 120 to 220 G in multiples of gravity is applied to the surface of the roll. In addition, when an intermediate layer is formed, it is preferable that the intermediate layer be formed using a centrifugal casting method such that molten steel having a chemical composition for the intermediate layer is poured into the rotating casting mold in the middle of the solidification or after solidification of the roll outer layer material has been completed. After the outer layer or the intermediate layer has been completely solidified, it is preferable that a composite roll be produced, by stopping rotation of the casting mold, then by erecting the casting mold, and thereafter by forming an inner layer using a static casting method. With this method, since the inner surface side of a roll outer layer material is remelted, a resulting roll is a composite roll that has the outer layer and the inner layer which are integrally welded together or a composite roll that has the outer layer, the intermediate layer which is integrally welded to the outer layer, and the inner layer which is integrally welded to the intermediate layer.

It is preferable that the inner layer which is cast using a static casting method be formed of, for example, nodular graphite cast iron or vermicular graphite cast iron (VC cast iron) which are excellent in terms of casting performance and mechanical properties. Since a roll, which is produced through a centrifugal casting method, is formed of an outer layer and an inner layer that are integrally welded together, the constituent elements of the outer layer material is mixed into the inner layer in an amount of about 1% to 8%. When carbide-forming elements such as Cr and V contained in the outer layer material are mixed into the inner layer, there is a decrease in the toughness of the inner layer. Therefore, it is preferable that the amount of the constituent elements of the outer layer mixed into the inner layer be less than 6%.

In addition, when an intermediate layer is formed, it is preferable that, for example, graphite steel, high-carbon steel, or hypoeutectic cast iron be used as an intermediate layer material. Since the intermediate layer and the outer layer are integrally welded together as with the outer layer and the inner layer, the constituent elements of the outer layer are mixed into the intermediate layer in an amount of 10% to 95%. It is important that the amount of the constituent elements of the outer layer mixed into the intermediate layer be as small as possible from the point of view of decreasing the amount of the constituent elements of the outer layer mixed into the inner layer.

It is preferable that the composite roll for hot rolling be subjected to a heat treatment after casting has been performed. It is preferable that the heat treatment be performed using a process in which the roll is heated at a temperature of 950° C. to 1150° C. and subjected to air cooling or air blast cooling and a process in which the roll is further heated at a temperature of 450° C. to 600° C., held at the temperature, and cooled once or more.

It is preferable that the hardness of the composite roll for hot rolling be 79 to 88 HS, or more preferably 80 to 87 HS. It is recommended that the heat treatment after casting has been performed be controlled so that such hardness is stably achieved.

EXAMPLE 1

Molten steels having the chemical compositions for a roll outer layer material given in Table 1 were prepared using a high-frequency furnace, and then, ring test materials (ring rolls having an outer diameter of 250 mmφ, a width of 75 mm, and a thickness of 55 mm) were prepared using a centrifugal casting method. The casting temperature was 1430° C. to 1550° C., and the centrifugal force was 180 G in multiples of gravity. After casting has been performed, by performing quenching with a quenching temperature of 1050° C., and by performing tempering with a tempering temperature of 540° C. to 560° C., the hardness was controlled to be 79 to 86 HS. A test sample for the observation of microstructure and a fatigue test sample were taken from the obtained ring test material, and the observation of microstructure and a hot rolling contact fatigue test were performed. The methods of the tests were as follows.

(1) Hot Rolling Contact Fatigue Test

A fatigue test sample illustrated in FIG. 3 (having an outer diameter of 60 mmφ, a thickness of 10 mm, and chamfered corners) was taken from the obtained ring test material. As illustrated in FIG. 3, notches (having a depth t of 1.2 mm and a length L in the circumferential direction of 0.8 mm) were formed at two positions in the outer circumferential surface of the fatigue test sample using an electric spark forming method (wire cutting method) with a wire having a diameter of 0.2 mmφ.

A hot rolling contact fatigue test was, as illustrated in FIG. 3, performed between two discs which were hot rolling contact fatigue test sample and an opposite material using a slip rolling type method such that, while the hot rolling contact fatigue test sample was cooled with water and rotated at a rotational speed of 700 rpm, the opposite piece (composed of S45C, and having an outer diameter of 190 mmφ) and a width of 15 mm) was heated at a temperature of 810° C., pressed to the rotating test sample with a contact load of 980 N, and rotated with a slip ratio of 9%. By rotating the test sample until the two notches formed in the hot rolling contact fatigue test sample broke, the rotation numbers until the notches broke were respectively counted, and the average of the two rotation numbers was defined as hot rolling contact fatigue life. When this hot rolling contact fatigue life was more than 300 thousands, it was considered to have excellent hot rolling contact fatigue life.

The obtained results are given in Table 2.

TABLE 1

| Test Sample No. | Chemical Composition (mass %) | | | | | | | | | | | (Cr + Mo)/V | Note |
|---|---|---|---|---|---|---|---|---|---|---|---|---|---|
| | C | Si | Mn | P | S | Cr | Mo | V | Nb | Al | REM | | |
| A | 2.8 | 0.5 | 0.6 | 0.024 | 0.011 | 6.2 | 6.1 | 5.6 | 0.7 | <0.001 | 0.018 | 2.2 | Example |
| B | 2.9 | 0.8 | 0.8 | 0.017 | 0.008 | 6.3 | 4.3 | 5.3 | 1.2 | 0.019 | <0.001 | 2.0 | Example |
| C | 2.6 | 0.4 | 0.5 | 0.020 | 0.009 | 5.5 | 4.8 | 5.9 | 1.0 | 0.023 | <0.001 | 1.7 | Example |
| D | 2.9 | 0.5 | 0.5 | 0.027 | 0.007 | 6.7 | 6.4 | 6.9 | 0.8 | 0.018 | 0.011 | 1.9 | Example |

TABLE 1-continued

| Test Sample No. | Chemical Composition (mass %) | | | | | | | | | | | (Cr + Mo)/V | Note |
|---|---|---|---|---|---|---|---|---|---|---|---|---|---|
| | C | Si | Mn | P | S | Cr | Mo | V | Nb | Al | REM | | |
| E | 2.5 | 0.4 | 0.4 | 0.014 | 0.011 | 5.2 | 5.2 | 6.4 | 1.1 | 0.018 | 0.016 | 1.6 | Example |
| F | 2.5 | 0.4 | 0.7 | 0.018 | 0.009 | 4.4 | 5.5 | 6.3 | 1.3 | 0.022 | <0.001 | 1.6 | Example |
| G | 2.4 | 0.6 | 0.3 | 0.028 | 0.012 | 7.2 | 5.7 | 6.8 | 0.6 | 0.018 | 0.027 | 1.9 | Example |
| H | 2.6 | 0.6 | 0.8 | 0.032 | 0.015 | 5.3 | 4.2 | 5.6 | 1.6 | 0.032 | 0.004 | 1.7 | Example |
| I | 2.9 | 0.3 | 0.4 | 0.028 | 0.012 | 6.3 | 4.1 | 5.4 | 2.7 | 0.024 | <0.001 | 1.9 | Example |
| J | 2.5 | 0.3 | 0.4 | 0.014 | 0.007 | 6.8 | 6.5 | 5.5 | 2.2 | 0.026 | <0.001 | 2.4 | Example |
| K | 2.7 | 0.4 | 0.5 | 0.012 | 0.003 | 5.3 | 5.2 | 6.2 | 1.2 | <0.001 | <0.001 | 1.7 | Example |
| L | 2.8 | 0.4 | 0.5 | 0.021 | 0.008 | 8.7 | 4.8 | 5.1 | 3.6 | 0.014 | <0.001 | 2.6 | Comparative Example |
| M | 2.7 | 0.4 | 0.4 | 0.024 | 0.011 | 13.6 | 6.2 | 5.1 | 1.4 | 0.011 | <0.001 | 3.9 | Comparative Example |
| N | 2.8 | 0.4 | 0.4 | 0.018 | 0.009 | 10.1 | 5.1 | 5.9 | 1.1 | 0.006 | <0.001 | 2.6 | Comparative Example |
| P | 3.0 | 0.3 | 0.4 | 0.022 | 0.008 | 7.7 | 6.2 | 5.5 | 0.9 | 0.010 | <0.001 | 2.5 | Comparative Example |
| Q | 3.0 | 0.7 | 1.0 | 0.025 | 0.014 | 3.7 | 4.1 | 4.5 | 0.6 | 0.023 | <0.001 | 1.7 | Comparative Example |
| R | 2.4 | 0.6 | 0.6 | 0.019 | 0.014 | 8.4 | 4.5 | 5.1 | 0.01 | 0.001 | <0.001 | 2.5 | Comparative Example |
| S | 2.9 | 0.4 | 0.5 | 0.022 | 0.009 | 8.2 | 4.8 | 8.1 | 2.0 | 0.021 | <0.001 | 1.6 | Comparative Example |
| T | 2.9 | 0.7 | 0.4 | 0.021 | 0.009 | 6.2 | 5.3 | 7.9 | <0.001 | 0.013 | <0.001 | 1.5 | Comparative Example |
| U | 2.2 | 0.5 | 0.5 | 0.025 | 0.011 | 6.7 | 4.3 | 4.7 | 0.02 | 0.003 | <0.001 | 2.3 | Comparative Example |
| V | 1.9 | 0.9 | 0.6 | 0.014 | 0.007 | 5.9 | 7.0 | 4.9 | 0.6 | <0.001 | <0.001 | 2.6 | Comparative Example |
| W | 2.5 | 0.6 | 0.6 | 0.0021 | 0.011 | 5.4 | 6.9 | 7.1 | <0.001 | 0.018 | <0.001 | 1.7 | Comparative Example |

TABLE 2

| Test Sample No. | Number of Small-size Carbides Having a Circle Equivalent Diameter of 3 to 30 mm (pieces/mm$^2$) | Number of Large-size Carbides Having a Circle Equivalent Diameter of 50 mm or More (pieces/mm$^2$) | Hot Rolling Fatigue Life (thousand times) | Note |
|---|---|---|---|---|
| A | 1632 | 13.2 | 466 | Example |
| B | 826 | 15.1 | 362 | Example |
| C | 1528 | 4.8 | 595 | Example |
| D | 2452 | 1.8 | 442 | Example |
| E | 1992 | 0.9 | 612 | Example |
| F | 1107 | 4.1 | 416 | Example |
| G | 1161 | 15.2 | 454 | Example |
| H | 1436 | 2.1 | 438 | Example |
| I | 579 | 2.8 | 396 | Example |
| J | 923 | 13.8 | 364 | Example |
| K | 1036 | 8.7 | 411 | Example |
| L | 891 | 25.6 | 157 | Comparative Example |
| M | 213 | 31.2 | 186 | Comparative Example |
| N | 1348 | 27.6 | 172 | Comparative Example |
| P | 1209 | 23.7 | 167 | Comparative Example |
| Q | 612 | 24.1 | 134 | Comparative Example |
| R | 454 | 17.3 | 103 | Comparative Example |
| S | 412 | 22.1 | 198 | Comparative Example |
| T | 742 | 24.3 | 201 | Comparative Example |
| U | 210 | 18.7 | 154 | Comparative Example |
| V | 397 | 2.9 | 159 | Comparative Example |
| W | 2686 | 1.2 | 216 | Comparative Example |

In all of our Examples, there was a significant increase in hot rolling contact fatigue life compared to the Comparative Examples.

In Comparative Examples M, R, S, U, and V, since the number of small-size carbides having a circle equivalent diameter of 3 to 30 μm was small, there was a decrease in hot rolling contact fatigue life. In addition, in Comparative Examples L, M, N, P, Q, S, and T, since excessive number of large-size carbides having a circle equivalent diameter of more than 50 μm exist, cracks propagated through the large-size carbides, which resulted in a significant decrease in hot rolling contact fatigue resistance. In addition, in Comparative Example W, since the number of small-size carbides was excessively large, cracks propagated through the adjacent carbides, which resulted in a significant decrease in hot rolling contact fatigue life.

The invention claimed is:
1. A roll outer layer material, which is a cast-iron roll outer layer material for an outer layer of a composite roll for hot rolling, the material containing small-size carbides having a circle equivalent diameter of 3 to 30 μm in a number of 500 to 2500 pieces/mm$^2$ and large-size carbides having a circle equivalent diameter of 50 μm or more in a number of 20 pieces/mm$^2$ or less,
   wherein the roller outer layer has a chemical composition containing, by mass %, C: 2.4% or more and 2.9% or less, Si: 0.2% or more and 1.0% or less, Mn: 0.2% or more and 1.0% or less, Cr: 4.0% or more and 7.5% or less, Mo: 4.0% or more and 6.5% or less, V: 5.3% or more and 7.0% or less, Nb: 0.5% or more and 3.0% or less, and the balance being Fe and inevitable impurities, wherein contents of Cr, Mo, and V satisfy expression below:

$$1.5 \leq (Cr+Mo)/V \leq 2.4, \text{ and}$$

where Cr, Mo, and V respectively represent the contents (mass %) of the corresponding chemical elements.

2. The roll outer layer material according to claim 1, having the chemical composition further containing, by mass %, one or more of Al: 0.001% or more and 0.05% or less and REM: 0.001% or more and 0.03% or less.

3. A composite roll for hot rolling, which is a composite roll for hot rolling formed of an outer layer and an inner layer integrally welded together, the outer layer formed of the roll outer layer material according to claim 1.

4. A composite roll for hot rolling, which is a composite roll for hot rolling formed of an outer layer and an inner layer integrally welded together, the outer layer formed of the roll outer layer material according to claim 2.

* * * * *